United States Patent [19]

Willmott

[11] 4,037,201

[45] July 19, 1977

[54] DIGITAL RADIO CONTROL

[75] Inventor: Colin Barns Willmott, Des Plaines, Ill.

[73] Assignee: Chamberlain Manufacturing Corporation, Chicago, Ill.

[21] Appl. No.: 634,504

[22] Filed: Nov. 24, 1975

[51] Int. Cl.[2] .......................... H04B 1/00; H04Q 9/00

[52] U.S. Cl. .................................. 340/167 R; 325/55; 325/64; 340/311; 340/168 B

[58] Field of Search ........... 340/164 R, 167 R, 167 A, 340/311, 168, 168 R, 168 B; 325/55, 37, 64; 307/223, 234; 328/62, 74, 75, 129

[56] References Cited

U.S. PATENT DOCUMENTS

| | | | |
|---|---|---|---|
| 3,349,374 | 10/1967 | Gabrielson et al. | 340/163 |
| 3,510,777 | 5/1970 | Gordon | 325/64 |
| 3,588,825 | 6/1971 | Shook | 340/163 |
| 3,631,398 | 12/1971 | Houghton | 340/167 |
| 3,665,313 | 5/1972 | Trent | 340/167 |
| 3,768,090 | 10/1973 | Williams | 340/164 |
| 3,899,773 | 8/1975 | Yamauchi et al. | 340/167 |
| 3,906,348 | 9/1975 | Willmott | 325/55 |

*Primary Examiner*—Donald J. Yusko

*Attorney, Agent, or Firm*—Hill, Gross, Simpson, Van Santen, Steadman, Chiara & Simpson

[57] ABSTRACT

An improved digital radio control including a transmitter and receiver utilizing codes in which a plurality of switches at the transmitter and receiver establish a binary serially transmitted code for energizing only a particular receiver which has its switches set to the same binary code and wherein the different conditions of the binary code depend upon the pulse length such that unique codes can be selected for particular transmitters and receivers so that interference with other systems in the vicinity will not occur.

10 Claims, 13 Drawing Figures

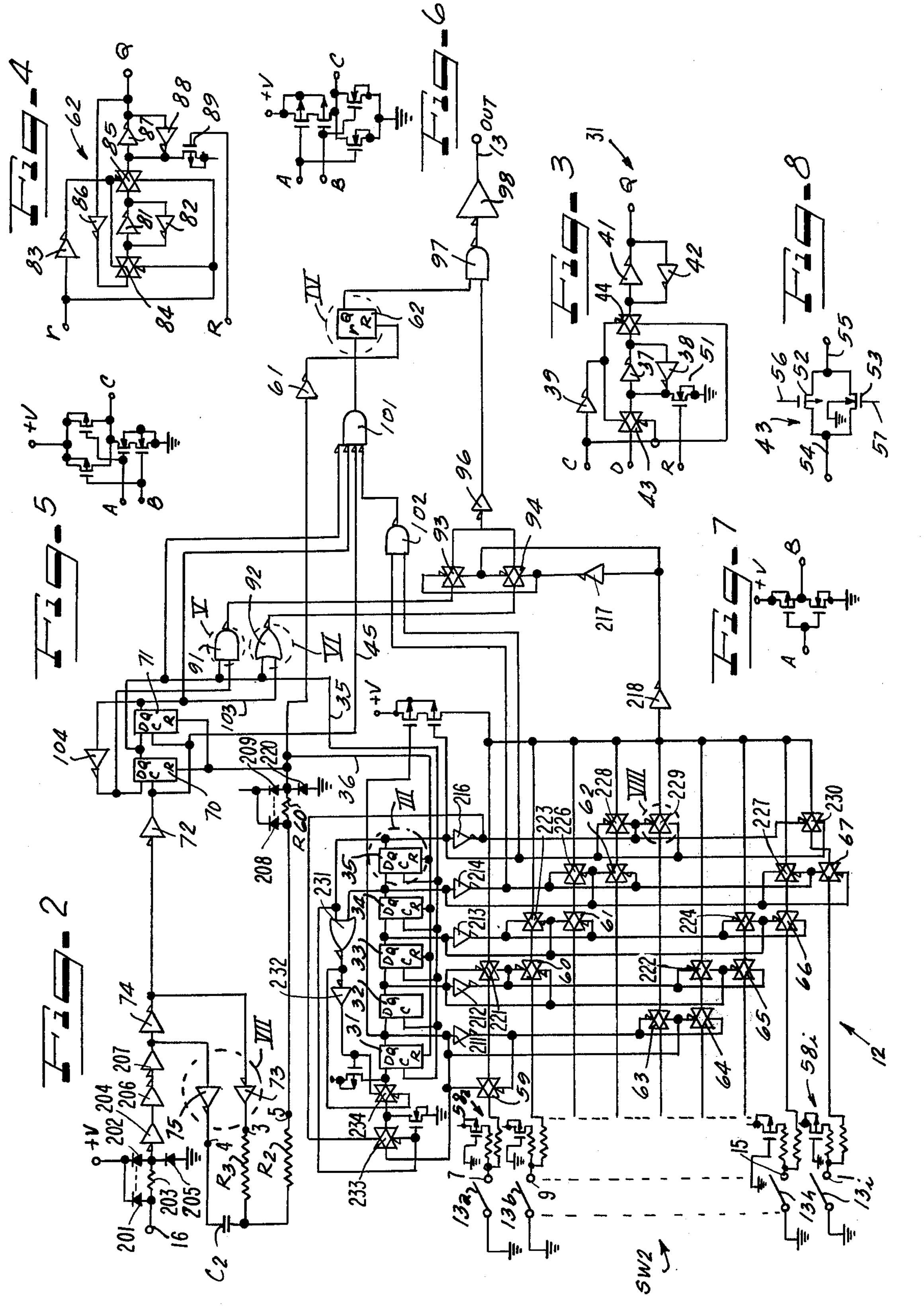

DIGITAL RADIO CONTROL

BACKGROUND OF THE INVENTION

1. Field of the Invention

This invention relates in general to a radio control system and in particular to a remote control system as for example for a garage door actuator.

2. Description of the Prior Art

My prior U.S. Pat. No. 3,906,348 which issued on Sept. 16, 1975 discloses an improved digital radio control system wherein a large number of possible code combinations can be selected to prevent interference between other control units within radio frequency range.

SUMMARY OF THE INVENTION

The present invention comprises an improvement on my system described in U.S. Pat. No. 3,906,348 in which simpler and smaller number of components are utilized so as to provide the novel transmitter coding system of the invention.

The present transmitter is implemented with a five stage ring counter and uses inverters, thus making the transmitter units smaller and the chip of the logic circuit simpler. The receiver of the invention also has been substantially simplified over the ones of the prior art and provides for improved reliability of the system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 2 is a block diagram of the transmitter encoder and switch module;

FIG. 3 is a detailed circuit diagram of a unit of the transmitter;

FIG. 4 is a detail block diagram of a unit of the transmitter;

FIG. 5 is a detail schematic view of a unit of the transmitter;

FIGS. 6, 7 and 8 are detail schematics of units of the transmitter;

DESCRIPTION OF THE PREFERRED EMBODIMENTS

Figure 1:
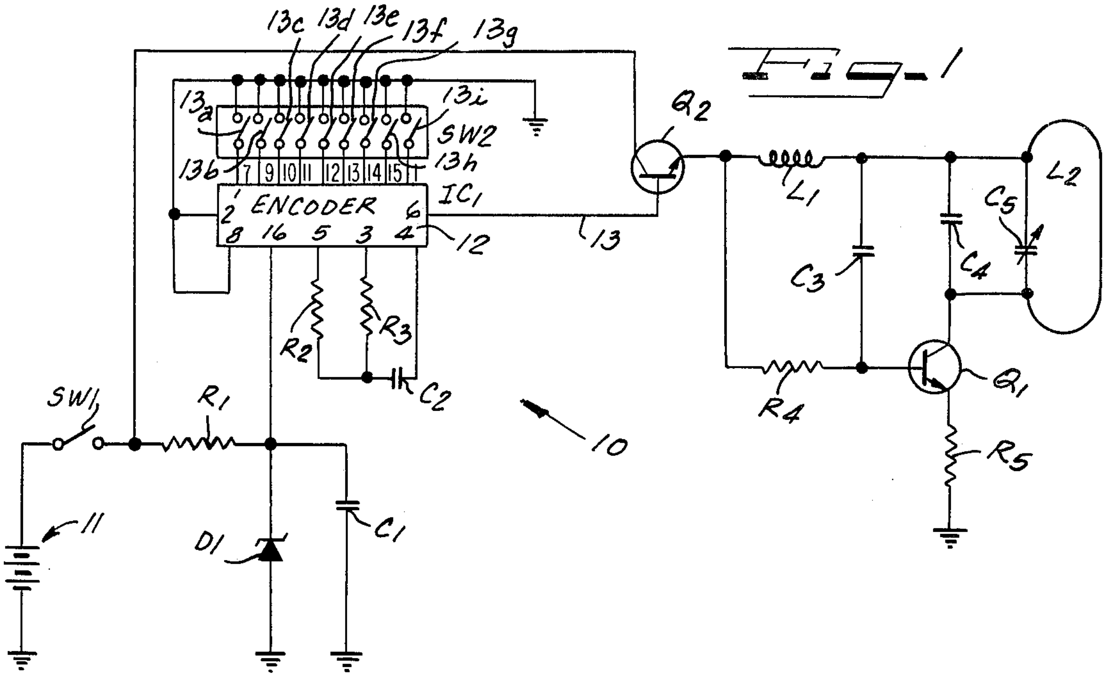
FIG. 1 is a schematic diagram of the transmitter of the invention.

FIG. 1 is a schematic diagram of the digital transmitter of the invention and includes a battery 11 which has one terminal connected to ground and its other terminal connected to a switch SW1. When switch SW1 is closed power is applied through resistor R1 to a zener diode D1 which has its other side connected to ground and to a capacitor C1 which has its other side connected to ground. The resistor R1 and diode D1 are connected to input terminal 16 of a CMOS encoder 12. A resistor R2 is connected to terminal 5 of the encoder 12 and has its other side connected to a resistor R3 which is connected to terminal 3 of the encoder 12. A capacitor C2 is connected from the junction point between resistors R2 and R3 and terminal 4 of the encoder 12. Terminals 2 and 8 of the encoder 12 are connected together and to ground. A plurality of encoding switches SW2 (13*a*–1-3*i*) have their movable contacts connected to input terminals 7, 9, 10, 11, 12, 13, 14, 15 and 1 of the encoder 12 and their fixed contacts connected to ground as shown. Output terminal 6 of encoder 12 is connected to the base of transistor Q2 which has its collector connected to the junction point between switch SW1 and resistor R1 and its emitter connected to an RF oscillator comprising the transistor Q1 which has its emitter connected to ground through resistor R5 and its base connected to the emitter of transistor Q2 through the resistor R4. An inductor L1 is connected from the emitter of Q2 through a capacitor C3 to the base of transistor Q1. A capacitor C4 is connected from the collector of transistor Q1 to the junction point of inductor L1 and capacitor C3. An antenna L2 is connected across the capacitor C4 and a tuning capacitor C5 is connected in parallel with the capacitor C4.

Figure 11:
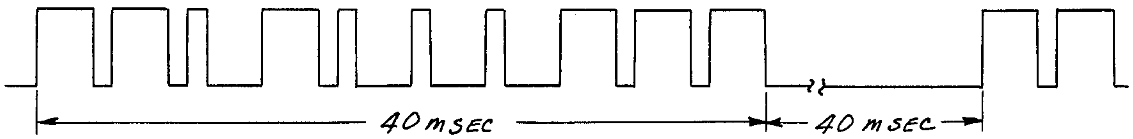
FIGS. 11 and 12 illustrate wave forms in the transmitter and receiver respectively.

The CMOS encoder 12 has an output train of pulses for a duration of approximately 40ms followed by a 40ms depth period as shown in FIG. 11. The pulse train has 10 output pulses and the last 9 of which are selectable in pulse width by the 9 position switches SW2. The pulse width is approximately 1ms when a particular switch 13 is closed and 3ms when the particular switch 13 is opened. The resistors R2, R3 and capacitor C2, control the internal clock frequency of 1kHz for timing the encoder. The transistor Q2 is connected as an emitter follower and provides isolation and also provides regulated output voltage for the RF oscillator circuit of transistor Q1. In a particular embodiment the tuning range of the carrier frequency of the transmitter was 290–400MHz.

Figure 9:
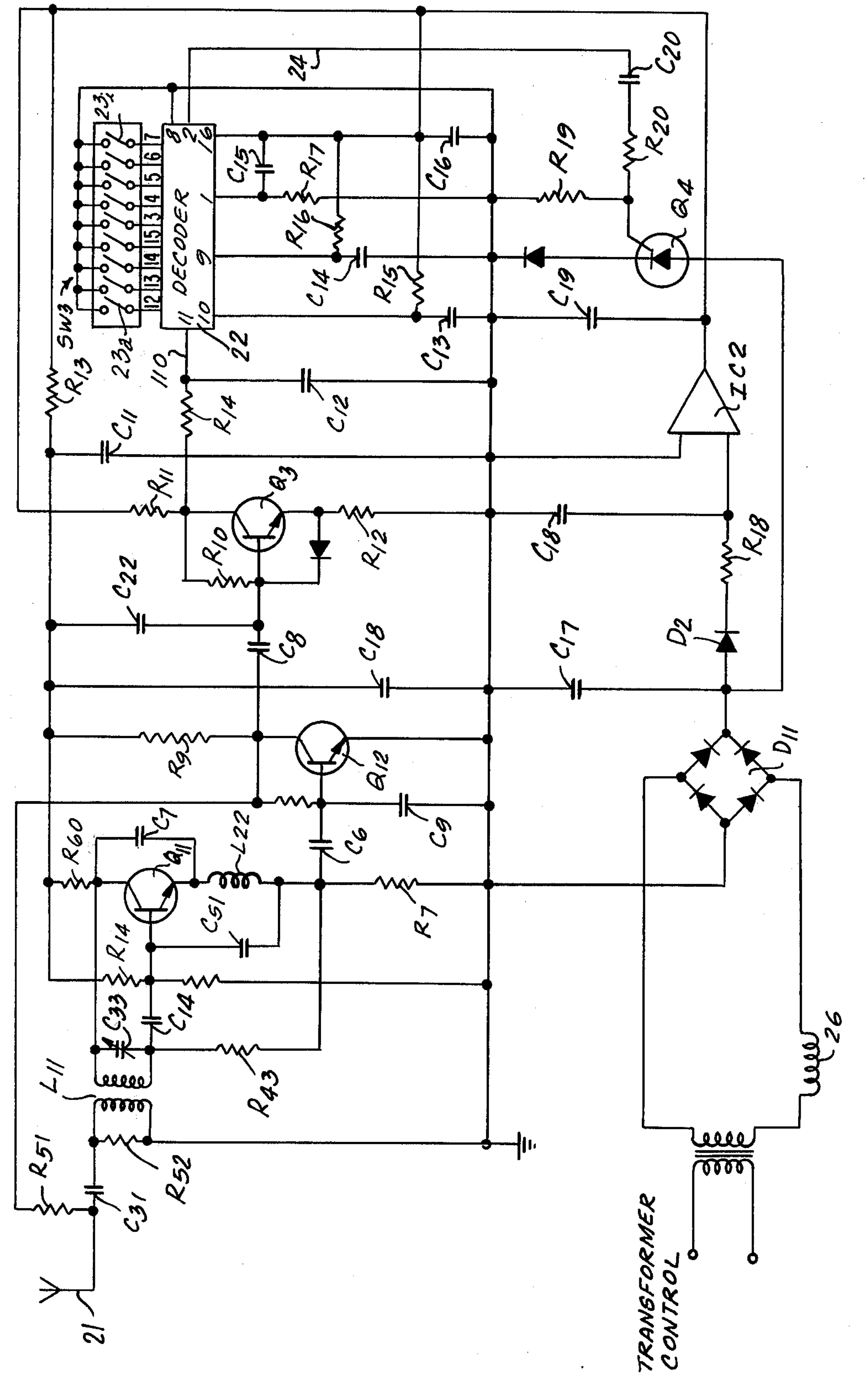
FIG. 9 is an electrical schematic of the receiver of the invention.

FIG. 9 illustrates the receiver of the invention and includes an antenna 21 which supplies an input to a super regenerative oscillator detector Q11 which has its base connected to a capacitor C14 which has its other side connected to the secondary of coupling transformer L11. A variable capacitor C33 is connected parallel with the secondary of inductor L11. A resistor R52 is connected in parallel with the primary of the inductor L11. The output of the oscillator detector Q11 is coupled through an inductor 22 and a capacitor C6 to the base of an amplifier transistor Q12 which has its emitter connected to ground. A second amplifing transistor Q3 has its base coupled to the collector of transistor Q12 through the capacitor C8 and supplies an output from its collector through a resistor R14 to a CMOS decoder 22. A switch SW3 has a plurality of switches 23*a* through 23*i* which are connected to the input terminals 12, 13, 14, 15, 3, 4, 5, 6 and 7 of the decoder 22. A timing circuit comprising the resistor R15 and the capacitor C13 is connected through input terminal 10 of the decoder 22 and provides a timing pulse of 2 miliseconds. A capacitor C14 and resistor R16 are connected to input terminal 9 of the decoder 22 and provide a timing pulse of 15 miliseconds. A resistor R17 and capacitor C15 are connected to input terminal 1 of decoder 22 and provide a timing pulse of 1 second.

The output of the decoder 22 is supplied through lead 24 to the gate of an SCR Q4 through the resistors R20 and capacitor C20 and the SCR Q4 is gated on when the voltage on lead 24 is high and remains off when the voltage on lead 24 is zero. The cathode of SCR Q4 is connected through diode D4 to ground and has its anode connected through a diode bridge D11 to a relay 26 which actuates the load of the receiver as, for example, a garage door actuating motor.

FIGS. 2 through 8 illustrate the detailed circuitry of the encoder 12.

As illustrated in FIG. 2 the central part of the encoder 12 comprises a five stage ring counter comprising the five flip-flop circuits 31 through 35 all of which have their reset terminal connected to reset conductor 36. Each of the flip-flop circuits 31 through 35 are as illustrated in FIG. 3 wherein the reset terminal R is connected to the gate of a field effect transistor 51 which has one terminal grounded and the other terminal connected to a pair of inverters 37 and 38. The inverters are connected to a pair of transmission gates circuits 43 and 48 which have the structure illustrated in FIG. 8. Each of the C terminals of the flip-flops 31 through 35 are connected through inverter 39 to the transmission gate circuits 43 and 44. The D terminal is connected to the transmission gate 43 and the Q terminal is connected through oppositely connected inverters 41 and 42 to the transmission gate circuit 48.

FIG. 8 illustrates the transmission gate circuits 43 and 48 which comprise a pair of field effect transistors 52 and 53 having input and output terminals 54 through 57. The switches **13*a* through 13*i* are connected through circuits 58*a*** through *i* which supply inputs to transmission gate circuits 59, 60, 61, 62, 63, 64, 65, 66 and 67 which are the same as the circuit illustrated in FIG. 8. The C terminals of flip-flop circuits 31 through 35 are connected to the Q and D terminals of flip-flops 70 and 71. The C terminals of flip-flops 70 and 71 are connected to an inverter 72 which receives an input from inverter 73 which is connected to resistor R3. An inverter 74 is connected to inverter 72 and to an inverter 75. A capacitor C2 is connected from inverter 75 to resistor R3. Resistor R2 is connected from the junction between capacitor C2 and resistor R3 and a resistor R60 which has its other side connected to an inverter 61 which is connected to the reset terminal of an integrated circuit 62 which is shown in detail in FIG. 4. The *r* terminal of circuit 62 is connected to an inverter 83 which has its other side connected to a pair of transmission gates 84 and 85 such as shown in FIG. 8. The Q terminal of circuit 62 is connected to an inverter 86 which has its other side connected to transmission gate 84. An inverter 87 is connected between Q terminals and an inverter 88 which has its other side connected through a field effect transistor 89 to the R terminal. A pair of inverters 81 and 82 are connected between the transmission gate circuits 64 and 65.

The lead 35 is connected to inputs of gates 91 and 92. The gate 91 also is connected to the D terminal of circuit 70. The gate 91 is of the form illustrated in FIG. 5 comprising four field effect transistors with the two inputs applied to terminals A and B and the output appearing on terminal C. The gate 92 is of the form illustrated in FIG. 6 comprising four field effect transistors with the inputs connected to terminals A and B and the output appearing at output terminal C. The output terminal of gate 91 is connected to the transmission gate 93 and the output of gate 92 is connected to transmission gate 94. The output of the transmission gates 93 and 94 is connected to an inverter 96 which has the form illustrated in FIG. 7. A gate 97 receives the output of inverter 96 and also the Q output from integrated circuit 62 and supplies an output through gate 98 to output lead 13. A gate 101 supplies an input to the *r* terminal of circuit 62 and receives inputs from the C terminals of circuits 70 and 71, an input from gate 102, an input from the lead 45 and an input from the conductor 103 connected between gate 92 and inverter 104 which has its other terminal connected to the D input of circuit 70. By setting the switches **13*a* through 13*i* a selected code can be chosen for a particular transmitter and a particular receiver so as to actuate the particular receiver when that particular code is transmitted by the transmitter. When the transmitter switch SW1 is closed, the selected code illustrated in FIG. 11** will be transmitted for 40 miliseconds then a 40 milisecond dead time will occur and when the transmitting pulses will occur and so on for four more times at least.

In FIG. 2, terminal 16 corresponds to input 16 of the encoder 12 illustrated in FIG. 1. This terminal is connected to a positive voltage source through a diode 201. A resistor 203 is connected between terminal 16 and an inverter 204. A diode 202 and 205 are connected between ground and the positive voltage supply plus V and their junction point is connected to the input of the inverter 204. The diodes 201, 202, and 203 eliminates static present on the input terminal 16. The inverter 204 is connected to an inverter 206 which has its output connected to an inverter 207 which supplies an input to inverter 74. A diode 210 is connected between ground and one end of resistor R60. The same end of the resistor R60 is connected to a diode 209 which has its other side connected to a voltage plus V. A diode 208 is connected from the first side of resistor R60 to plus V. An inverter 211 is connected from the Q terminal of circuit 31 to circuit 63 and 64. An inverter 212 is connected from the Q terminal of circuit 32 to circuits 221, 60, 222 and 65. An inverter 213 is connected from the Q terminal of circuit 33 to circuits 223, 61 and 224 and 66. An inverter 214 is connected from the Q terminal of circuit 34 to circuits 62, 67, 226 and 227. An inverter 216 is connected from the Q terminal of circuit 35 to circuits 228, 229 and 230. A gate 231 receives inputs from the Q terminals of circuits 34 and 35 and supplies an output to a circuit 234 and to an inverter 232 which has its other side connected to circuit 234 as shown. The Q terminal of circuit 35 is also connected to circuit 233, as shown.

This transmitted signal is detected by the receiver illustrated in FIG. 9 and supplied from the detector Q11 through the amplifiers Q12 and Q3 to the decoder 22 wherein it is compared with the settings of switches **23*a* through 23*i*.** In the event the correct code is received four times, the receiver will be energized.

Figure 10:
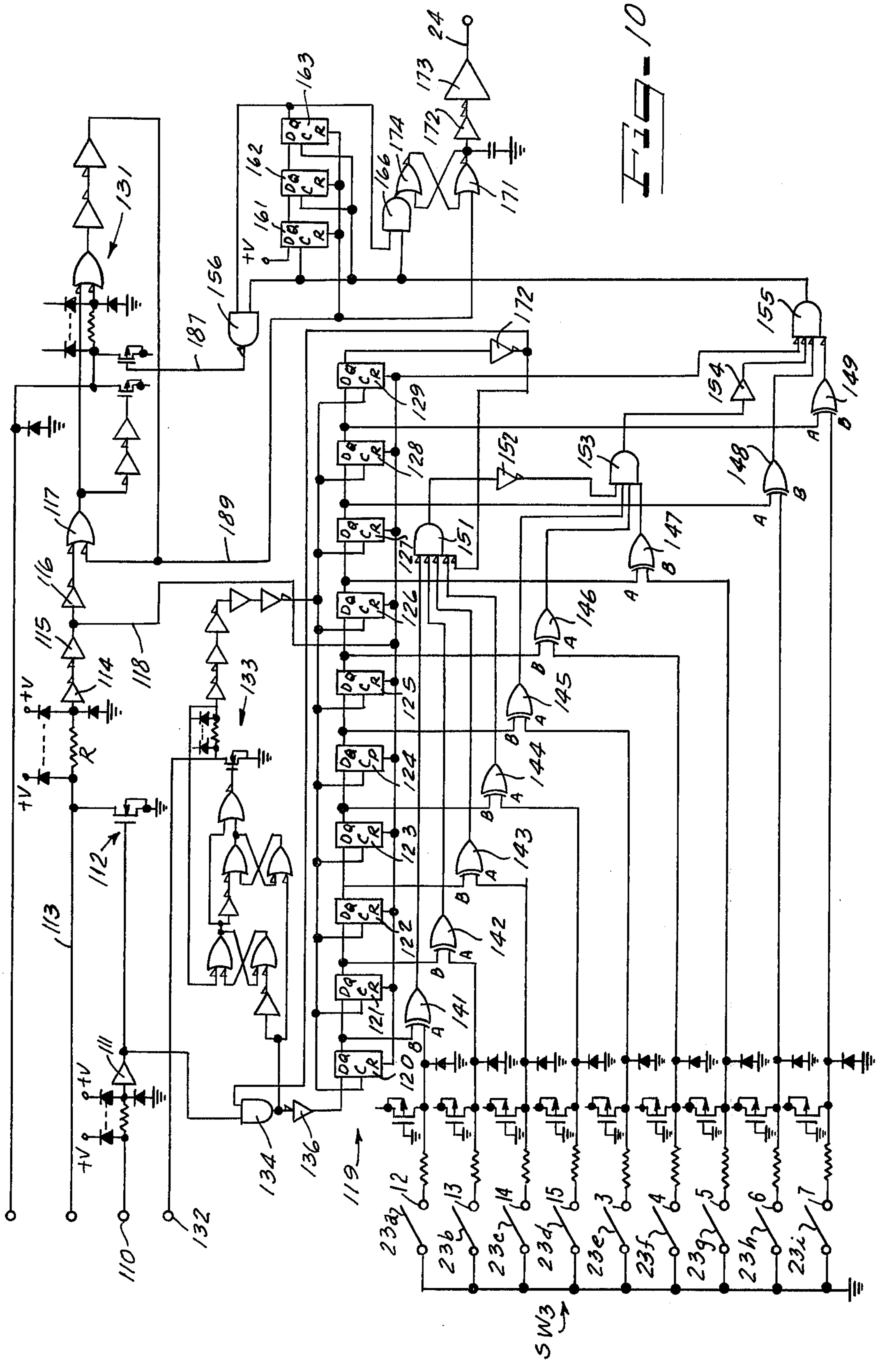
FIG. 10 is a block diagram of the receiver decoder and switching module.

FIG. 10 illustrates the decoder 22 of the receiver which has its input terminal 110 connected to receive the output of the amplifier Q3 shown in FIG. 9. The data is supplied through an inverter 11 to a field effect transistor 112. A 10 milisecond input is supplied to lead 113 and connects to the field effect transistor 112 and through resistor R and inverter gates 114, 115 and 116 to the gate 117. A shift enable lead 118 is connected to the output of the inverter 115 and is connected to the reset terminals of the shift register 119 comprising the circuits 120 through 129. A 1 second one shot circuit 131 is connected to the output of the gate 117 and supplies an input to the gate 117. A 2 milisecond one shot circuit 133 is connected to terminal 132. A NAND-gate 134 is connected to the output of 111 and supplies input to the D terminal of the first circuit 120 of the shift register 119 through the inverter 136.

The switches 23*a* through 23*i* are connected through resistors with inputs to gates 141 through 149. Second inputs of the gates 141 through 149 are connected to the Q terminals of circuits 120 through 128. The output of gates 141 through 144 are connected to a gate 151 which has its output connected through an inverter 152 to the input of a gate 153. Gates 145, 146 and 147 also supply inputs to gate 153. Gate 153 is connected through gate 154 to a gate 155 which also receives inputs from gates 148 and 149 and is connected to the reset terminal of the circuits 120 through 129. The output of gate 155 is connected to gate 156 and to the input C of circuits 161, 162 and 163. The Q output of circuit 163 is connected to input to gate 156 and to input of a gate 166 which also receives an input from the output of gate 155. The reset terminals of circuits 161, 162 and 163 are connected to the output of the 1 second one shot circuit 131 and are also connected to the input of a gate 171 which is connected to the output lead 24 through the gates 172 and 173. The output of the gate 166 is supplied through a gate 174 to the input of gate 171. The output of circuit 129 of the shift register 119 is connected to a gate 172 which supplies an input to gate 151.

Figure 13:
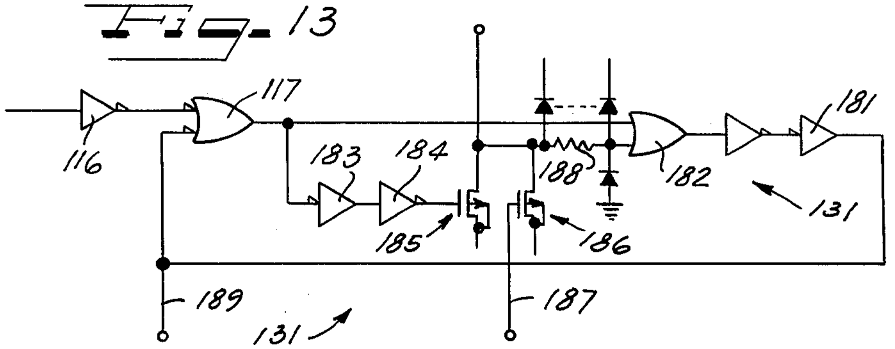
FIG. 13 illustrates a one shot multivibrator circuit of the invention.

FIG. 13 illustrates in greater detail the one shot circuit of the invention, as for example, circuit 131 which comprises the inverter 116 which supplies an input to gate 117 which also receives an output from inverter 181. Gate 117 supplies inputs to gate 182 as well as gate 183. The output of gate 183 is connected to gate 184 which is connected to the gate of a field effect transistor 185. A field effect transistor 186 receives an input from gate 156 shown in FIG. 10 and supplies an input through resistor 188 to gate 182.

Figure 12:
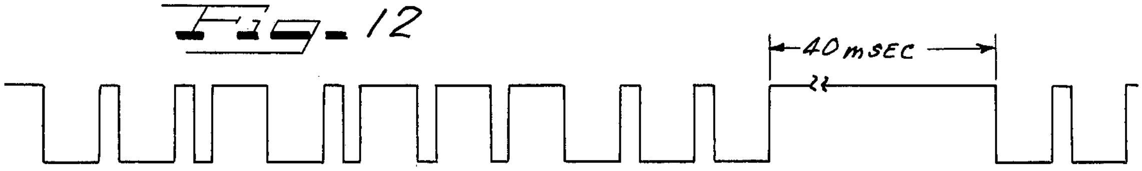

In operation, the receiver must receive four correct code frames as illustrated in FIG. 12 before the output lead 24 will supply an enabling signal to the SCR Q4 illustrated in FIG. 9 and thus actuate the load, as for example, a garage door.

Thus, the invention provides an improved transmitter and receiver for actuating a load and so as to prevent interference between other transmitters and receivers and although it has been described with respect to preferred embodiments it is not to be so limited as changes and modifications may be made which are within the full intended scope of the invention as defined by the appended claims.

I claim as my invention:

1. A coding system for a transmitter and receiver so that a selected receiver will respond to a particular transmitter comprising a transmitter capable of transmitting a RF signal in a binary code having pulses having time lengths T1 and T2 of different times, means at said transmitter for setting said binary code to a selected combination, a receiver tuned to said RF signal, and including code comparing means receiving the incoming binary code, means at said receiver for setting a binary code to a selected combination supplying an input to said code comparing means, output means actuated by said comparing means if said means for setting a binary code at the transmitter and receiver are set to the same code combination, wherein said means at said transmitter for setting said binary code includes a plurality of two position switches, an encoder including a five stage ring counter with the outputs of each stage connected to the inputs of the following stage and connected to said plurality of two position switches, a flip-flop connected to said ring counter to drive it, an on-off switch connected to said flip-flop circuit, a pair of resistors and a capacitor connected to said flip-flop circuit to control the timing of the transmitted pulses, and an RF oscillator receiving the output of said encoder and keyed to oscillate thereby to cause it to radiate said binary code signal.

2. A coding system for a transmitter and receiver according to claim 1 wherein said transmitter radiates said binary code signal a number of times each spaced by a fixed dead time.

3. A coding system for a transmitter according to claim 2 wherein binary code signal is radiated at least four times.

4. A coding system according to claim 3 wherein said receiver includes a decoder including a 10 stage shift register with the outputs of each stage connected to the input of the following stage and said means for setting said binary code at the receiver comprises a plurality of two position switches.

5. A coding system according to claim 4 wherein said receiver decoder includes a fixed time one shot multivibrator which supplies an output to said 10 stage shift register.

6. A coding system according to claim 5 wherein said receiver includes a second fixed time one shot multivibrator, a first gate receiving the output of said shift register and supplying an output each time a received signal is received which corresponds to the condition wherein the transmitter and receiver two position switches are similarly set, a storage device receiving the output of said first gate, a second gate connected to the output of said storage device and passing an output when the correct signal code is received more than once, and a load connected to said second gate and energized when said output is received.

7. A coding system according to claim 6 wherein said second gate passes an output when the correct code is received four times.

8. A coding system according to claim 7 including a silicon controlled rectifier with its gate electrode connected to the output of said second gate and to the load to energize the load when the correct code has been received.

9. A coding system according to claim 7 wherein said second one shot multivibrator includes a third gate, a pair of field effect transistors connected an input to said third gate, a fourth gate receiving an input from said third gate and supplying an output to said third gate, and said fourth gate supplying an input to one of said pair of field effect transistors.

10. A coding system according to claim 9 wherein said storage device supplies an input to the other one of said pair of field effect transistors.

* * * * *